(12) United States Patent
Furuya et al.

(10) Patent No.: US 7,052,770 B2
(45) Date of Patent: May 30, 2006

(54) HARDCOAT COMPOSITIONS AND HARDCOATED ARTICLES

(75) Inventors: Masahiro Furuya, Gunma-ken (JP); Koichi Higuchi, Gunma-ken (JP); Kazuharu Sato, Gunma-ken (JP); Kazuyuki Matsumura, Gunma-ken (JP); Masaaki Yamaya, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 200 days.

(21) Appl. No.: 10/461,463

(22) Filed: Jun. 16, 2003

(65) Prior Publication Data

US 2003/0236347 A1    Dec. 25, 2003

(30) Foreign Application Priority Data

Jun. 18, 2002  (JP) .............................. 2002-176643
Sep. 30, 2002  (JP) .............................. 2002-285672

(51) Int. Cl.
*B32B 25/20*  (2006.01)
*C08L 83/04*  (2006.01)

(52) U.S. Cl. ...................... 428/447; 524/430; 524/432; 524/588; 524/837; 524/858; 524/863

(58) Field of Classification Search ................ 524/430, 524/432, 588, 837, 858, 863; 428/447
See application file for complete search history.

(56) References Cited

U.S. PATENT DOCUMENTS 4,353,959 A    10/1982  Olson et al.
4,444,973 A    4/1984  Schonfelder et al.
5,081,181 A *  1/1992  Takahashi et al. ........... 524/766
5,357,024 A *  10/1994  Leclaire ........................ 528/39
5,844,060 A *  12/1998  Furuya et al. ................. 528/30
5,902,851 A *  5/1999  Yamaki et al. ............... 524/506
6,165,619 A *  12/2000  Ikenaga et al. .............. 428/448
6,214,416 B1 *  4/2001  Sakagami et al. ........... 427/387

FOREIGN PATENT DOCUMENTS

EP    0851009 A2    7/1998
EP    0863191 A2    9/1998
EP    1046689 A1    10/2000
JP    56-92059 A    7/1981
JP    1-149878 A    6/1989
JP    6-73329 A    3/1994

OTHER PUBLICATIONS

Tohge, N. et al., "Effects of UV-Irradiation on the Formation of Oxide Thin Films from Chemically Modified Metal-Alkoxides", Journal of Sol-Gel Science and Technology, 2, pp. 581-585, (1994).

* cited by examiner

*Primary Examiner*—Jeffrey B. Robertson
(74) *Attorney, Agent, or Firm*—Birch, Stewart, Kolasch & Birch, LLP

(57) ABSTRACT

A hardcoat composition comprising (A) a hydrolytic condensate of a hydrolyzable silicon compound of formula: $R^1_a SiX_{(4-a)}$ with at least 1 mole of water per mole of hydrolyzable group X, (B) a metal oxide, (C) a siloxane resin of formula: $R^2_b Si(OR^3)_c (OH)_d O_{(4-b-c-d)/2}$ and having a Mw of at least 2,000, which is solid at a temperature of not higher than 40° C., and (D) a curing catalyst forms a hardcoat film having satisfactory hardness, transparency and adhesion as well as improved weather resistance and presenting a surface that is repellent to marker ink.

13 Claims, No Drawings

HARDCOAT COMPOSITIONS AND HARDCOATED ARTICLES

This invention relates to hardcoat compositions which have satisfactory hardness, transparency and adhesion and are improved in weather resistance in that they undergo no micro-cracking or separation even after long-term outdoor weathering.

BACKGROUND OF THE INVENTION

Substrates of organic resins such as polycarbonate resins, acrylic resins and PET resins are now utilized as building materials, structural materials and optical articles (e.g., eyeglass lenses) by taking advantage of their transparency and impact resistance as well as light weight and low cost. For example, as the window glass of automobiles, transparent organic resins substitute for prior art inorganic glass to achieve great contributions to weight reduction and fuel consumption savings. However, since these organic resin substrates are susceptible to surface flaw which detracts from transparency, they are often coated with high hardness coating materials.

It is known from the past that the preferred coating materials are hardcoat compositions comprising a silica dispersion and a heat curable siloxane resin. This is because siloxane resins are generally resistant to degradation by sunlight and ultraviolet radiation and thus quite suitable for surface protection over a long period of time.

However, these hardcoat compositions have several drawbacks. For example, the adhesion between a hardcoat layer and a resin substrate is insufficient. One known approach for improving the adhesion is to form a primer layer on the resin substrate. Since the hardcoat layer itself is composed mainly of siloxane resin and silica and lacks an ability to shield ultraviolet radiation, the resin substrate, the primer and the interface therebetween can be degraded or discolored by ultraviolet radiation. For prohibiting this phenomenon, it was proposed to add a UV absorber to the primer layer.

The hardcoat layer has a high hardness and mar resistance, but the high hardness, in turn, gives rise to a potential problem that the hardcoat layer cracks. A solution to this problem was proposed in JP-A 6-73329 which discloses a hardcoat composition comprising a silica-dispersed solution of a partially hydrolyzed oligomer of hydrolyzable organosilane, and a silanol-containing polyorganosiloxane. However, a hardcoat film of this composition formed on a plastic substrate is less resistant to marring because the hydrolyzable organosilane is restricted to a partial hydrolyzate.

SUMMARY OF THE INVENTION

An object of the present invention is to provide a hardcoat composition which has satisfactory hardness, transparency and adhesion, which is improved in weather resistance in that they undergo no micro-cracking or separation even after long-term outdoor weathering and which is resistant to staining, graffiti or the like in that a coating film of the composition offers a surface repellent to marker ink; and an article having a hardcoat film of the composition.

It has been found that when a hardcoat composition comprising a product obtained by hydrolytic condensation of a hydrolyzable silicon compound with at least equivalent of water, a metal oxide, a siloxane resin, and a curing catalyst is applied and heat cured to a substrate, especially a plastic substrate having a primer layer thereon, there is formed a coating film having high hardness, abrasion resistance and good adhesion; and that the inclusion of the siloxane resin in the composition eliminates the drawback of the coating film that it is susceptible to micro-cracks under a rapid temperature change or in an accelerated weathering test, while maintaining the above-described advantages. It has also been found that the addition of the siloxane resin to the composition alters the surface state of a coating film to reduce the contaminant receptivity and marker ink receptivity thereof for thereby maintaining the outer appearance of the coating film unchanged over time.

Accordingly, the present invention provides a hardcoat composition comprising (A) a hydrolytic condensate obtained by hydrolytic condensation of at least one hydrolyzable silicon compound of the general formula (1):

$$R^1_a SiX_{(4-a)} \tag{1}$$

wherein $R^1$ is an organic group having 1 to 18 carbon atoms, X is a hydrolyzable group, and "a" is an integer of 0 to 2, with the proviso that a compound of only a=0 and a compound of only a=2 are excluded, with at least 1 mole of water per mole of the hydrolyzable group X, (B) a metal oxide, (C) a siloxane resin represented by the average compositional formula (2):

$$R^2_b Si(OR^3)_c(OH)_d O_{(4-b-c-d)/2} \tag{2}$$

wherein $R^2$ is independently an organic group having 1 to 18 carbon atoms, $R^3$ is independently an organic group having 1 to 4 carbon atoms, b, c and d are numbers satisfying $0.8 \leq b \leq 1.5$, $0 \leq c \leq 0.3$, $0.001 \leq d \leq 0.5$, and $0.801 \leq b+c+d<2$, and having a weight average molecular weight of at least 2,000, which is solid at a temperature of not higher than 40° C., and (D) a curing catalyst.

Also contemplated herein is an article comprising a substrate and a hardcoat film which is formed on the substrate by applying and curing the hardcoat composition thereto.

DESCRIPTION OF THE PREFERRED EMBODIMENTS

Component (A) in the hardcoat composition of the invention is a hydrolytic condensate obtained by hydrolytic condensation of at least one hydrolyzable silicon compound of the general formula (1):

$$R^1_a SiX_{(4-a)} \tag{1}$$

wherein $R^1$ is an organic group having 1 to 18 carbon atoms, X is a hydrolyzable group, and "a" is an integer of 0 to 2, with the proviso that use of a compound of only a=0 and use of a compound of only a=2 are excluded, with at least 1 mole of water per mole of the hydrolyzable group X. The hydrolytic condensate preferably has a weight average molecular weight (Mw) of up to 3,000, especially less than 2,000 as measured by gel permeation chromatography (GPC). The lower limit of Mw is selected as appropriate although the Mw is usually at least 200, especially at least 300.

$R^1$ is an organic group having 1 to 18 carbon atoms, preferably a substituted or unsubstituted monovalent hydrocarbon group having 1 to 10 carbon atoms. Suitable monovalent hydrocarbon groups include straight, branched or cyclic alkyl groups such as methyl, ethyl, propyl, butyl, hexyl, decyl, cyclohexyl and 1,1,2-trimethylpropyl, aryl groups such as phenyl and tolyl, aralkyl groups such as benzyl and phenylethyl, alkenyl groups such as vinyl, allyl, propenyl and butenyl, and substituted ones of the foregoing in which some or all of the hydrogen atoms are substituted with epoxy, amino, alkylamino, aminoalkylamino, mercapto, (meth)acryloxy groups, halogen atoms (e.g., chloro), cyano groups or the like, such as glycidoxypropyl aminopropyl, mercaptopropyl and (meth)acryloxypropyl. Of these, methyl and glycidoxypropyl are preferred.

X is a hydrolyzable group, for example, a hydrolyzable group having 1 to 6 carbon atoms, chlorine atom or the like. Suitable hydrolyzable groups of 1 to 6 carbon atoms include alkoxy groups such as methoxy, ethoxy, propoxy, butoxy, phenoxy and isopropenoxy, aryloxy groups, alkenyloxy groups, alkoxyalkoxy groups such as methoxyethoxy, acyloxy groups such as acetoxy, and oxime groups such as butanoxime. Of these, a chlorine atom and alkoxy groups are preferred. Alkoxy groups of 1 to 4 carbon atoms are more preferred for ease of operation, ease of distillation of by-products, and stability, with methoxy and ethoxy groups being especially preferred.

Examples of the hydrolyzable silicon compound falling in the range of formula (1) include vinyltrichlorosilane, vinyltrimethoxysilane, vinyltriethoxysilane, vinylmethyldichlorosilane, vinylmethyldimethoxysilane, vinylmethyldiethoxysilane, 5-hexenyltrimethoxysilane, 3-glycidoxypropyltrimethoxysilane, 3-glycidoxypropyltriethoxysilane, 3-glycidoxypropylmethyldimethoxysilane, 3-glycidoxypropylmethyldiethoxysilane, 3-(meth)acryloxypropyltrimethoxysilane, 3-(meth)acryloxypropyltriethoxysilane, 3-(meth)acryloxypropylmethyldimethoxysilane, 3-(meth)acryloxypropylmethyldiethoxysilane, 2-(3,4-epoxycyclohexyl)ethyltrimethoxysilane, 2-(3,4-epoxycyclohexyl)ethyldimethoxymethylsilane, 2-(3,4-epoxycyclohexyl)ethyltriethoxysilane, 2-(3,4-epoxycyclohexyl)ethyldiethoxymethylsilane, 3-(4-vinylphenyl)propyltrimethoxysilane, 4-vinylphenylmethyltrimethoxysilane, 4-vinylphenyltrimethoxysilane, 3-aminopropyltrimethoxysilane, 3-aminopropyltriethoxysilane, 3-aminopropylmethyldimethoxysilane, 3-aminopropylmethyldiethoxysilane, 3-(2-aminoethyl)aminopropyltrimethoxysilane, 3-mercaptopropyltrimethoxysilane, 3-mercaptopropyltriethoxysilane, 3-mercaptopropylmethyldimethoxysilane, 3-mercaptopropylmethyldiethoxysilane and analogues, which are known as silane coupling agents; and tetrachlorosilane, tetramethoxysilane, tetraethoxysilane, tetrabutoxysilane, methyltrichlorosilane, methyltrimethoxysilane, methyltriethoxysilane, methyltriisopropoxysilane, methyltributoxysilane, methyltriisoprepenoxysilane, ethyltrichlorosilane, ethyltrimethoxysilane, ethyltriethoxysilane, propyltrichlorosilane, propyltrimethoxysilane, propyltriethoxysilane, butyltrichlorosilane, butyltrimethoxysilane, hexyltrichlorosilane, hexyltrimethoxysilane, decyltrichlorosilane, decyltrimethoxysilane, phenyltrichlorosilane, phenyltrimethoxysilane, cyclohexyltrichlorosilane, cyclohexyltrimethoxysilane, propylmethyldichlorosilane, propylmethyldimethoxysilane, hexylmethyldichlorosilane, hexylmethyldimethoxysilane, phenylmethyldichlorosilane, phenylmethyldimethoxysilane, etc.

The hydrolyzable silicon compounds may be used alone or in admixture of two or more. It is required that the hydrolytic product have a branched structure. If a compound of only a=2 is used, the hydrolytic condensate becomes a linear oil which is poor in hardness and mar resistance. If a compound of only a=0 is used, crack susceptibility becomes high. For this reason, the use of a compound of a=0 alone and a compound of a=2 alone is excluded in the present invention. Acceptable are a situation where a compound of a=0 and a compound of a=2 are used in combination, a situation where a compound of a=1 is used alone, and a situation where a compound of a=1 is used in combination with a compound of a=0 and/or a compound of a=2. It is preferred to use a hydrolyzable silicon compound of a=1 or a mixture of hydrolyzable silicon compounds containing at least a compound of a=1.

As component (A), methoxysilanes and ethoxysilanes are preferred for ease of operation and ease of distillation of by-products. Inclusion of at least 40 mol % of a trifunctional hydrolyzable silane (silane of a=1) is more preferred from the standpoints of hardness, abrasion resistance and adhesion of a hardcoat composition.

Component (A) is a hydrolytic condensate obtained by effecting hydrolytic condensation of the hydrolyzable silicon compound with water in an amount of at least 1 mole per mole of the hydrolyzable group X. A typical method of hydrolyzing the hydrolyzable silicon compound to form a hydrolytic condensate which can be used herein is to subject the hydrolyzable silicon compound to hydrolysis in water or in water and an organic solvent, preferably to hydrolytic condensation in water and a polar solvent.

The amount of water used for hydrolysis is at least 1 mole, preferably at least 1.2 moles, per mole of the hydrolyzable group X. If the amount of water is less than 1 mole, hydrolysis of hydrolyzable groups proceeds only partially, with a relatively large quantity of hydrolyzable groups being left unreacted. Since it is believed that component (A) in itself plays the role of a binder for component (B), metal oxide in the hardcoat composition, the hydrolyzate with some hydrolyzable groups left unreacted suffers a corresponding drop of crosslinked density, which detracts from hardness, mar resistance and adhesion. No upper limit need be imposed to the amount of water although the amount of water is usually up to 10 moles, especially up to 5 moles per mole of the hydrolyzable group X.

To the water used in hydrolysis, a polar organic solvent is preferably added. Examples of the polar solvent include alcohols such as methanol, ethanol, propanol, isopropanol, butanol, isobutanol, t-butanol and diacetone alcohol, and ethylene glycol, monoethylene glycol monoether, propylene glycol, propylene glycol monoether, etc. The polar solvent can be a dispersing medium for component (B). It is also acceptable to use a hydrolytic catalyst. The hydrolytic catalyst used herein may be any of prior art well-known catalysts, preferably acidic hydrogen halides, carboxylic acids, sulfonic acids, acidic or weakly acidic inorganic salts, and solid acids such as ion-exchange resins. Specific examples include hydrogen fluoride, hydrochloric acid, nitric acid, sulfuric acid, organic acids as typified by acetic acid and maleic acid, methylsulfonic acid, and cation-exchange resins having sulfonate or carboxylate groups on surfaces. The amount of hydrolytic catalyst is preferably 0.001 to 10 mol % based on the moles of the hydrolyzable group X. Hydrolysis is preferably effected under weakly acidic conditions, especially in a range of pH 2 to pH 7. Unless hydrolysis is effected under weakly acidic conditions, silanol groups on the resultant hydrolyzate become unstable, sometimes allowing for further progress of condensation reaction to an extra high molecular weight.

Preferably, component (A) is prepared by adding a water dispersion of the metal oxide (B) to the hydrolyzable silicon compound which is the starting reactant of component (A). This means that component (A) is prepared in the co-presence of component (B). This preparation method is efficient particularly when an acidic or alkaline water dispersion of metal oxide or metal oxide sol is used. The invention recommends the use of an acidic metal oxide sol (i.e., acidic water dispersion of metal oxide). When this preparation method is employed, it is yet preferred that the amount of water in the acidic metal oxide sol be at least 1 mole, especially at least 1.2 moles per mole of the hydrolyzable group X. With less than 1 mole, as previously described, some hydrolyzable groups are left unreacted, leading to a drop of crosslinked density and hence, losses of hardness and adhesion.

Component (B) is a metal oxide, preferably in particle form. It is believed that component (B) plays not only the role of a filler for imparting hardness and abrasion resistance to a coating, but also the role of a crosslinker for forming on particle surfaces bonds with silanol groups in component (A) serving as a binder. More particularly, component (B) can form a bond (M-O—Si) with component (A) since hydroxyl groups (M-OH) are present on the particle surface, provided that M represents a metal atom. The metal is preferably selected from among silicon, titanium, zirconium, hafnium, zinc, iron, antimony, tin, cerium, and aluminum. Preferred are a colloidal silicon oxide dispersion (i.e., colloidal silica), dispersions of titanium oxide, zirconium oxide, and cerium oxide, and dispersions of composite particles of two or more of these oxides.

In particular, particles of the oxide of titanium, zirconium, zinc, iron, antimony, tin or cerium may be used for imparting an additional function such as UV absorption or high refractive index as well.

The microparticulate metal oxide is preferably used as a dispersion in a dispersing medium, that is, a metal oxide sol. The dispersing medium is preferably water or polar solvents such as alcohols.

The particle size of microparticulate metal oxide which can be used herein should be small enough to maintain the coating film transparent, and is preferably in the range of 1 to 300 nm, especially in the range of 1 to 100 nm. For the purpose of enhancing the stability of dispersed particles, the metal oxide particles may be treated or covered, in part, with a silane coupling agent, a tetraalkoxysilane (e.g., tetraethoxysilane), a titanium coupling agent, a carboxyl-containing organic polymer or the like. Since component (B), as used herein, refers to an inorganic metal oxide, the amount of organic matter which is added or coated for stabilization purpose should preferably be less than 10% by weight of the metal oxide.

Preferably 5 to 300 parts by weight, especially 5 to 100 parts by weight of component (B) is compounded per 100 parts by weight of component (A).

Component (C) is a siloxane resin represented by the average compositional formula (2):

$$R^2_b Si(OR^3)_c(OH)_d O_{(4-b-c-d)/2} \quad (2)$$

wherein $R^2$ is independently an organic group having 1 to 18 carbon atoms, $R^3$ is independently an organic group having 1 to 4 carbon atoms, b, c and d are numbers satisfying $0.8 \leq b \leq 1.5$, $0 \leq c \leq 0.3$, $0.001 \leq d \leq 0.5$, and $0.801 \leq b+c+d<2$. The siloxane resin is solid at a temperature of 40° C. or lower and has a weight average molecular weight of at least 2,000, preferably 2,000 to 10,000, as measured by GPC using a polystyrene standard. It serves to impart flexibility to the hardcoat film to prevent the film from cracking while maintaining a high hardness. Presumably this function is based on the fact that component (C) participates only limitedly in the crosslinking reaction of the hardcoat composition because of a relatively small quantity of terminal groups ($OR^3$ and OH), and thus plays a role like a buffer that fills in interstices of the crosslinked network. If the quantity of terminal groups is too small, the siloxane resin may not be firmly fixed within the film, which is sometimes detrimental to solvent resistance or the like. Therefore, component (C), despite a relatively small quantity of terminal groups, should be able to form bonds with components (A) and (B) so that component (C) is limitedly fixed within the hardcoat film.

Additionally, the inclusion of the siloxane resin (C) in the composition alters the surface state of a hardcoat film, for example, such that the surface of a (cured) hardcoat film becomes repellent to commercial felt-tip marker ink.

$R^2$ may be the same or different and is selected from organic groups having 1 to 18 carbon atoms, preferably 1 to 10 carbon atoms. Suitable organic groups are substituted or unsubstituted monovalent hydrocarbon groups, for example, alkyl groups, aryl groups, aralkyl groups, alkenyl groups, and halo-substituted alkyl groups, with the alkyl and aryl groups being preferred. Examples include methyl, ethyl, propyl, butyl, hexyl, octyl, decyl, cyclopentyl, cyclohexyl, phenyl, vinyl, and trifluoropropyl.

$R^3$ may be the same or different and is selected from organic groups having 1 to 4 carbon atoms, preferably alkyl and alkenyl groups. ($OR^3$) represents terminal groups of the siloxane resin other than silanol groups (Si—OH), for example, methoxy, ethoxy, propoxy and butoxy groups. Of these, methoxy and ethoxy groups are preferred because the starting reactants are readily available.

In formula (2), b, c and d are numbers satisfying $0.8 \leq b \leq 1.5$, $0 \leq c \leq 0.3$, $0.001 \leq d \leq 0.5$, and $0.801 \leq b+c+d<2$. If b representative of the $R^2$ content is less than 0.8, crack inhibition lowers. If b is more than 1.5, more organic groups render the siloxane resin more hydrophobic and less compatible in the hardcoat composition so that the siloxane resin can bleed out of the film, losing the anti-cracking effect and causing defective outer appearance like cissing.

If c representative of the $OR^3$ content is more than 0.3, the siloxane resin has more terminal groups and participates more in the condensation reaction with components (A) and (B), failing to develop the anti-cracking effect. The alkoxy groups and analogues can be quantitatively determined by infrared (IR) absorption spectroscopy or an alcohol determination method utilizing alkali cracking.

If d representative of the OH content is more than 0.5, the siloxane resin participates more in the condensation reaction with components (A) and (B) during heat curing, losing crack resistance, though maintaining a high hardness. If d is less than 0.001, formation of bonds with components (A) and (B) becomes nil so that the siloxane resin is not fixed within the film, losing hardness and solvent resistance.

Preferably, b, c and d are $0.9 \leq b \leq 1.3$, $0.001 \leq c \leq 0.2$, $0.01 \leq d<0.3$, and $0.911 \leq b+c+d \leq 1.8$.

These values can be determined by subjecting a siloxane resin to $^{29}$Si-NMR analysis and computing the average chemical structure of the resin. For instance, T units ($RSiO_{3/2}$) synthesized from a trifunctional hydrolyzable silane include structural units of four types (T0 to T3), shown below, for which signals are observed at different chemical shifts in the $^{29}$Si-NMR spectrum. The areas of the signals indicate the ratio of respective structures incorporated. From this incorporation ratio and a quantity of residual alkoxy groups determined from IR spectrum, the structure of the siloxane resin can be determined.

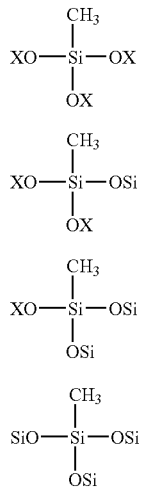

(T0), (T1), (T2), (T3)

In the formulae, X is H or $R^3$.

The other requirement for component (C) is that the siloxane resin is solid at a temperature of 40° C. or lower. On use of a siloxane resin which is liquid below 40° C., the hardcoat film loses hardness and solvent resistance even if bonds are formed between the siloxane resin (C) and components (A) and (B) during heat curing. Additionally, the siloxane resin (C) should preferably have a volatile content of up to 2% by weight when dried at 105° C. for 3 hours. With a volatile content of more than 2% by weight, the solid resin may flow or fuse even below 40° C., leading to inefficient operation.

The molecular weight of the siloxane resin can be determined by gel permeation chromatography (GPC). The siloxane resin used herein should have a weight average molecular weight (Mw) of at least 2,000, preferably 2,000 to 10,000 as measured by GPC using a polystyrene standard. With a Mw of less than 2,000, the siloxane resin has more terminal groups and participates more in crosslinking reaction, failing to develop the anti-cracking effect. A siloxane resin with too high Mw may become less compatible with components (A) and (B), resulting in a coating film becoming opaque.

The siloxane resin preferably has a softening point of 60 to 90° C. With a softening point of lower than 60° C., a hardcoat film may become low in hardness and abrasion resistance. A softening point of higher than 90° C. may lead to lowerings of compatibility with components (A) and (B) and crack resistance. It is noted that the softening point is measured by the ring and ball method according to JIS K2207.

As a general rule, the siloxane resin is represented by a combination of Q units ($SiO_{4/2}$) derived from a tetrafunctional silane, T units ($R^4SiO_{3/2}$) derived from a trifunctional silane, D units ($R^4SiO_{2/2}$) derived from a difunctional silane and M units ($R^4SiO_{1/2}$) derived from a monofunctional silane. When component (C) used herein is represented by this notation, the proportion of the moles of T units represented by $R^4SiO_{3/2}$ to the total moles of entire siloxane units is preferably at least 70 mol %. If the content of T units is less than 70 mol %, the overall balance of hardness, abrasion resistance, adhesion, applicability, outer appearance and the like may be disrupted. The remainder may consist of M, D and Q units, the sum of these units being preferably up to 30 mol %.

It is noted that in the siloxane units represented by the general formula (3):

$$R^4SiO_{3/2} \tag{3}$$

$R^4$ is independently an organic group having 1 to 18 carbon atoms, at least 80 mol % of $R^4$ being preferably an organic group having 1 to 6 carbon atoms.

The same groups as exemplified for $R^2$ are employable as $R^4$. Preferably at least 80 mol % of $R^4$ are monovalent hydrocarbon groups having 1 to 6 carbon atoms, especially alkyl groups. The monovalent hydrocarbon groups having 1 to 6 carbon atoms which are preferred for hardness, abrasion resistance, adhesion and compatibility include methyl, ethyl, propyl, butyl, pentyl, hexyl, cyclopentyl and cyclohexyl groups, with methyl, ethyl and propyl groups being more preferred.

In compounding the siloxane resin (C), the siloxane resin may be previously dissolved in an organic solvent to form a solution before it is mixed with other components. Heating is sometimes necessary when the siloxane resin is dissolved in an organic solvent. The preferred solvents are ethanol, isopropanol, isobutanol, propylene glycol monoalkyl ethers, and diacetone alcohol, but not limited thereto.

For the preparation of the siloxane resin (C), a prior art well-known resin production method as described below is applicable. In a typical polymer production method, water is added to at least one hydrolyzable silane compound or a mixture thereof with an organic solvent. Agitation brings the hydrolyzable silane compound in contact with water for hydrolytic reaction. Silanol groups created by the hydrolytic reaction are reacted with each other or with other hydrolyzable groups to form siloxane bonds (—Si—O—Si—) for polycondensation, obtaining a polymer. After polymerization, the reaction solution is neutralized. The organic solvent is finally distilled off, leaving a siloxane resin in the solid form. Unlike solvent-insoluble gel, the solid resin thus obtained can be dissolved again in an organic solvent. In the method which is advantageous when the siloxane resin produced thereby is used as component (C), hydrolysis is carried out under strongly acidic conditions, especially below pH 2. Under such strongly acidic conditions, silanol groups contributing to polycondensation reaction become more unstable than under weakly acidic conditions, so that reaction rapidly proceeds in sequence to form a higher molecular weight polymer.

The amount of water used in hydrolysis depends on the type of hydrolyzable group on the silane used as the starting reactant. When an alkoxysilane is used as the starting reactant, the amount of water used in hydrolysis is preferably less than 1.5 moles, more preferably 0.6 to 1.0 mole per mole of hydrolyzable groups. If the amount of water used in hydrolysis is 1.5 moles or more in the polycondensation reaction under strongly acidic conditions, three-dimensional condensation proceeds rapidly to form an undesirable gel. When a chlorosilane is used as the starting reactant, the amount of water used in hydrolysis is not critical.

In the hydrolysis, an organic solvent may be used. Non-polar solvents which are low soluble in water are preferred. The preferred organic solvents are hydrocarbon solvents such as toluene, xylene and hexane. If the organic solvent is less miscible with water, the progress of hydrolytic reaction is retarded, and in this case, a polar solvent such as alcohol may be used together. The hydrolyzable silane compound used as the starting reactant may be the same as that of formula (1). Examples include vinyltrichlorosilane, vinyltrimethoxysilane, vinyltriethoxysilane, vinylmethyldichlorosilane, vinylmethyldimethoxysilane, vinylmethyldiethoxysilane, tetrachlorosilane, tetramethoxysilane, tetraethoxysilane, methyltrichlorosilane, methyltrimethoxysilane, dimethyldimethoxysilane, methyltriethoxysilane, methyltriisopropoxysilane, propyltrichlorosilane, propyltrimethoxysilane, propyltriethoxysilane, hexyltrichlorosilane, hexyltrimethoxysilane, phenyltrichlorosilane, phenyltrimethoxysilane, and diphenyldimethoxysilane. Of these, vinyltrimethoxysilane, vinyltriethoxysilane, methyltrimethoxysilane, dimethyldimethoxysilane and phenyltrimethoxysilane are preferred.

Component (C) is preferably compounded in an amount of 3 to 100 parts by weight, especially 3 to 80 parts by weight per 100 parts by weight of components (A) and (B) combined. Less than 3 parts of component (C) may fail to develop the anti-cracking effect whereas more than 100 parts of component (C) may substantially detract from the hardness and abrasion resistance of a hardcoat film.

Component (D) is a curing catalyst. The curing catalysts used in conventional well-known hardcoat compositions are useful. Examples include basic compounds such as lithium hydroxide, sodium hydroxide, potassium hydroxide, sodium methylate, sodium propionate, potassium propionate, sodium acetate, potassium acetate, sodium formate, potassium formate, trimethylbenzylammonium hydroxide, tetramethylammonium hydroxide, n-hexylamine, tributylamine, diazabicycloundecene (DBU) and dicyandiamide; metal-containing compounds such as tetraisopropyl titanate, tetrabutyl titanate, acetylacetonatotitanium, aluminum triisobutoxide, aluminum triisopropoxide, acetylacetonatoaluminum, aluminum perchlorate, aluminum chloride, cobalt octylate, acetylacetonatocobalt, acetylacetonatoiron, acetylacetonatotin, dibutyltin octylate, and dibutyltin laurate; and acidic compounds such as p-toluenesulfonic acid and trichloroacetic acid. Of these, sodium propionate, sodium acetate, sodium formate, trimethylbenzylammonium hydroxide, tetramethylammonium hydroxide and acetylacetonatoaluminum are preferred.

In a preferred embodiment, the hardcoat composition further contains (E) a hydrolyzate or hydrolytic condensate of a reaction product or mixture of a metal alkoxide and a β-diketone and/or β-ketoester. The hydrolyzate or hydrolytic condensate may be used alone or in admixture of two or more. The metal alkoxide has the general formula (4):

wherein M is at least one metal selected from the group consisting of Ti, Zr, Hf, Al, Fe, Zn, In, Cu, Sn, W and Ce, n is the valence of the metal, and $R^5$ is an organic group having 1 to 6 carbon atoms.

The preferred β-diketone and β-ketoester have the general formula (5):

wherein $R^6$ is a $C_{1-8}$ alkyl group or aryl group, and $R^7$ is a $C_{1-8}$ alkyl group, aryl group or $C_{1-4}$ alkoxy group.

The hydrolyzate or hydrolytic condensate (E) is preferably one obtained by subjecting a reaction product or mixture of 1 mole of the metal alkoxide with 0.5 to (n–0.5) moles of the β-diketone and/or β-ketoester (wherein n is as defined above) to hydrolysis or hydrolytic condensation in 0.5 to 30 moles of water.

Examples of the metal alkoxide having formula (4): $M(OR^5)_n$ include tetra-n-propoxytitanium, tetra-i-propoxytitanium, tetra-n-butoxytitanium, tetra-i-butoxytitanium, tetraethoxyzirconium, tetra-i-propoxyzirconium, tetra-n-butoxyzirconium, tetra-sec-butoxyzirconium, tetra-t-butoxyzirconium, tetra-n-pentoxyzirconium, tri-i-propoxyindium, pentaethoxytungsten, hexaethoxytungsten, tetramethoxysilane, and tetraethoxysilane.

In formula (5) representing the β-diketone and β-ketoester, $R^6$ is a $C_{1-8}$ alkyl group or aryl group, for example, methyl, ethyl, propyl, butyl, hexyl and phenyl. Methyl is preferred.

$R^7$ is a $C_{1-8}$ alkyl group, aryl group or $C_{1-4}$ alkoxy group. Examples of $C_{1-8}$ alkyl group and aryl group are the same as exemplified for $R^6$, with n-propyl i-propyl, n-butyl, i-butyl, t-butyl and sec-butyl being preferred. Examples of $C_{1-4}$ alkoxy group include methoxy and ethoxy, with ethoxy being preferred.

Examples of the β-diketone and β-ketoester include acetylacetone, 2,4-hexanedione, 2,4-heptanedione, 3,5-heptanedione, 2,4-octanedione, 2,4-nonanedione, 5-methylhexanedione, 2,2,6,6-tetramethyl-3,5-heptanedione, methyl acetoacetate, ethyl acetoacetate, n-propyl acetoacetate, isopropyl acetoacetate, n-butyl acetoacetate, isobutyl acetoacetate, t-butyl acetoacetate, and sec-butyl acetoacetate. Of these, acetylacetone is most preferred. The β-diketones and β-ketoesters may be used alone or in admixture of two or more.

The reaction of the metal alkoxide with the β-diketone and β-ketoester is preferably performed at a temperature of –10° C. to 120° C. for about 0.5 to about 10 hours. A chelate compound is obtained from this reaction. In general, the chelate compound is low hydrolyzable and relatively stable as compared with the alkoxide alone.

In the reaction, 0.5 to (n–0.5) moles, especially 1 to 3 moles of the β-diketone and/or β-ketoester is preferably used per mole of the metal alkoxide. With less than 0.5 mole of the β-diketone and/or β-ketoester, rapid condensation may proceed during hydrolysis to form a gel which is solvent insoluble or less dispersible. With more than (n–0.5) moles of the β-diketone and/or β-ketoester, the chelate substitutes for most of the alkoxy groups on the metal so the subsequent hydrolytic condensation may no longer proceed, failing to form a condensate.

The chelate compound undergoes hydrolysis and condensation reaction when an acidic or alkaline aqueous solution is added thereto. The hydrolyzate is a monomer in the form of the chelate compound whose alkoxy residues are hydrolyzed and converted to OH groups, and the condensate is a polymer formed by condensation reaction of the hydrolyzate molecules or the hydrolyzate with a non-hydrolyzed chelate compound. The amount of water used in hydrolysis is preferably 0.5 to 30 moles, especially 1 to 5 moles per mole of the metal alkoxide. With less than 0.5 mole of water, a more amount of active alkoxy groups can be left to adversely affect the storage stability of a hardcoat composition. With more than 30 moles of water, the chelate introduced for stabilization may be released through hydrolysis, losing dispersion stability.

The hydrolysis and condensation reaction is preferably effected at a temperature of 0° C. to 120° C. for about 1 to about 30 hours. Heating reaction at a temperature of 15° C. to 90° C. for about 5 to about 20 hours is preferred. Hydrolysis and condensation reaction under acidic or alkaline conditions is more preferred. To this end, any of prior art well-known acidic or basic catalysts may be used. Preferred acidic catalysts are acidic hydrogen halides, carboxylic acids and sulfonic acids. Examples include hydrochloric acid, nitric acid, sulfuric acid, acetic acid, and maleic acid. Preferred basic catalysts are amines. Examples include ammonia, dimethylamine and diethylamine. As is well known in the art, metal compounds such as tin and titanium compounds may be used as the hydrolytic condensation catalyst.

Component (E), when dispersed in the coating, can absorb those rays of sunlight falling in the ultraviolet and near-ultraviolet regions. Then compounding of component (E) is effective for improving the weather resistance of a primer layer and a resin substrate for thereby preventing a lowering of interfacial adhesion between the hardcoat layer and the primer layer and between the primer layer and the resin substrate. It is known in the art that metal oxides like component (B), especially oxides composed mainly of titanium, zirconium, hafnium, cerium or the like have a UV shielding ability, and they have been applied to hardcoat compositions for that purpose. However, the UV region that can be shielded by such oxides is, in the case of titania, for example, a region having a peak near 260 nm, and its absorptivity at 300 nm or longer is very low. In contrast, the hydrolytic condensate of titanium chelate having acetylacetonato coordinated thereto as component (E) in the preferred embodiment of the invention has peaks at about 260 nm and additionally, at about 340 nm (see N. Tohge, K. Shinmou, T. Minami, Journal of Sol-Gel Science and Technology, 2, 581-585, 1994). This is comparable to the region of known UV absorbing organic compounds such as 2,4-dihydroxybenzophenone, 2,2',4,4'-tetrahydroxybenzophenone, and benzotriazoles. Incorporating component (E) in the hardcoat composition imparts an extremely greater UV shielding ability than the single use of metal oxide (B) such as titania.

An appropriate amount of component (E) is 1 to 30 parts by weight, more preferably 1.5 to 20 parts by weight per 100 parts by weight of components (A) and (B) combined. More than 30 parts by weight of component (E) increases the UV screening ability, but may lower the hardness and transparency of a coating.

In the hardcoat composition of the invention comprising the above-mentioned components, diluents, pH regulating agents, pigments, dyes, leveling agents and storage stabilizers may be used for the purpose of imparting good coating performance.

As the diluent, water and organic solvents may be used. Preferred organic solvents include alcohols, ketones, esters and ethers. Suitable pH regulating agents include combinations of an acid with a basic compound serving as a buffer, for example, combinations of acetic acid with sodium acetate, citric acid with disodium hydrogen phosphate, and the like.

Weather resistance is improved by adding a photo-stabilizer having at least one cyclic hindered amine structure in the molecule. Useful are photo-stabilizers which are dissolvable in the solvent used in the hardcoat composition and low volatile. The photo-stabilizer is preferably used in an amount of 1 to 10 parts by weight per 100 parts by weight of solids in the hardcoat composition. More than 10 parts of the photo-stabilizer may detract from the adhesion of a coating.

Examples of the photo-stabilizer include 3-dodecyl-1-(2,2,6,6-tetramethyl-4-piperidinyl)pyrrolidine-2,5-dione, N-methyl-3-dodecyl-1-(2,2,6,6-tetramethyl-4-piperidinyl) pyrrolidine-2,5-dione, N-acetyl-3-dodecyl-1-(2,2,6,6-tetramethyl-4-piperidinyl)pyrrolidine-2,5-dione, bis(2,2,6,6-tetramethyl-4-piperidyl)sebacate, bis(1,2,2,6,6-pentamethyl-4-piperidyl)sebacate, tetrakis(2,2,6,6-tetramethyl-4-piperidyl) 1,2,3,4-butanetetracarboxylate, tetrakis(1,2,2,6,6-pentamethyl-4-piperidyl) 1,2,3,4-butanetetracarboxylate, the condensate of 1,2,3,4-butanetetracarboxylic acid, 2,2,6,6-tetramethyl-piperidinol and tridecanol, 8-acetyl-3-dodecyl-7,7,9,9-tetramethyl-1,3,8-triazaspiro[4,5]decane-2,4-dione, the condensate of 1,2,3,4-butanetetracarboxylic acid, 1,2,6,6-tetramethyl-4-piperidinol and β,β,β,β'-tetramethyl-3,9-(2,4,8,10-tetraoxaspiro[5,5]-undecane) diethanol, and the condensate of 1,2,3,4-butanetetracarboxylic acid, 2,2,6,6-tetramethyl-4-piperidinol and β,β,β,β'-tetramethyl-3,9-(2,4,8,10-tetraoxaspiro[5,5]undecane)diethanol.

For the purpose of fixing the photo-stabilizer, there may be used silyl-modified photo-stabilizers as described in JP-B 61-56187, for example, 2,2,6,6-tetramethylpiperidino-4-propyltrimethoxysilane, 2,2,6,6-tetramethylpiperidino-4-propylmethyldimethoxysilane, 2,2,6,6-tetramethylpiperidino-4-propyltriethoxysilane, 2,2,6,6-tetramethylpiperidino-4-propylmethyldiethoxysilane, and (partial) hydrolyzates thereof. These photo-stabilizers may be used alone or in admixture.

Ordinary UV absorbers may be added as long as they do not compromise the objects of the invention. Suitable UV absorbers are compound derivatives having hydroxybenzophenone, benzotriazole, cyanoacrylate and triazine as the main skeleton. Vinyl and similar polymers containing such UV absorbers on side chains may also be used.

Examples of the UV absorber include 2,4'-dihydroxybenzophenone, 2,2',4,4'-tetrahydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-n-benzyloxybenzophenone, 2,2'-dihydroxy-4,4'-dimethoxybenzophenone, 2,2'-dihydroxy-4,4'-diethoxybenzophenone, 2,2'-dihydroxy-4,4'-dipropoxybenzophenone, 2,2'-dihydroxy-4,4'-dibutoxybenzophenone, 2,2'-dihydroxy-4-methoxy-4'-propoxybenzophenone, 2,2'-dihydroxy-4-methoxy-4'-butoxybenzophenone, 2,3,4-trihydroxybenzophenone, 2-(2-hydroxy-5-methylphenyl)benzotriazole, 2-(2-hydroxy-5-t-butylphenyl)benzotriazole, 2-(2-hydroxy-3,5-di-t-butylphenyl)benzotriazole, ethyl-2-cyano-3,3-diphenyl acrylate, 2-ethylhexyl-2-cyano-3,3-diphenyl acrylate, 2-(2-hydroxy-4-hexyloxyphenyl)-4,6-diphenyltriazine, a polymer of 4-(2-acryloxyethoxy)-2-hydroxybenzophenone, and a polymer of 2-(2'-hydroxy-5'-methacryloxyethylphenyl)-2H-benzotriazole. These UV absorbers may be used alone or in admixture.

The polymer used as the UV absorber should preferably have hydrolyzable silyl groups introduced in side chains. In this case, upon curing of a hardcoat composition coating, the UV absorber can form bonds with components (A), (B) and (E) in the composition so that it is more firmly fixed within the coating.

For example, a monomer such as 3-(meth)acryloxypropyltrimethoxysilane, 3-(meth)acryloxypropyltriethoxysilane, 3-(meth)acryloxypropylmethyldimethoxysilane, 3-(meth)acryloxypropylmethyldiethoxysilane, 3-(meth)acryloxypropyldimethylmethoxysilane or 3-(meth)acryloxypropyldimethylethoxysilane can be copolymerized with another monomer to construct the vinyl or similar polymer containing a UV absorber on a side chain.

The hardcoat composition of the invention can be used as a hardcoat film by applying and curing it to a substrate. The substrate may be of various materials such as plastics, ceramics, glass, metals and composites thereof although the material is not limited thereto. Preferred are substrates of various plastic materials, for example, polycarbonate, polystyrene, acrylic resins, modified acrylic resins, urethane resins, thiourethane resins, polycondensates of halogenated bisphenol A with ethylene glycol, acrylic urethane resins, halogenated aryl group-containing acrylic resins, and sulfur-containing resins. Also useful are resin substrates whose surface has been tailored, for example, by corona discharge treatment or treatment with an acid or alkali solution, and laminates consisting of a substrate body and a surface layer of different resins. Exemplary laminates include a laminate of a polycarbonate resin substrate and a surface layer thereon of acrylic resin or urethane resin, and a laminate of a polyester resin substrate and a surface layer thereon of acrylic resin, both manufactured by co-extrusion.

The method of applying the hardcoat composition to the substrate may be selected from spray coating, roll coating, dip coating, spin coating and flow coating methods although any other suitable coating method may be used.

In the practice of the invention, a primer layer is preferably provided between the hardcoat film and the substrate for enhancing the adhesion to the substrate.

The method of forming a coating preferably includes the successive steps of applying a prior art well-known primer composition to a substrate as a first layer, curing the primer coating by air drying or heat curing, applying the hardcoat composition onto the primer layer, and drying at room temperature or heating the coating to form a hardcoat layer as a second layer. As the primer layer, use may be made of the materials described in JP-A 56-92059 and JP-A 1-149878, polymers of acrylic and/or vinyl monomers, copolymers of acrylic and/or vinyl monomers with alkoxysilyl group-containing acrylic monomers, and copolymers of acrylic and/or vinyl monomers with UV-absorbing vinyl monomers.

When coatings are to be cured, they may be held in air for air drying or heated. The heating temperature and time are not critical. Usually, for both the primer layer and the hardcoat layer, coatings can be cured by heating at room temperature to 250° C., preferably 70 to 150° C. for about 10 minutes to 2 hours, preferably about 20 minutes to 1.5 hours. Particularly when the primer layer is made of a crosslinkable thermosetting resin, it is possible that the curing conditions be controlled so as to leave the resin partially uncured for enhancing the adhesion to the hardcoat layer.

Preferably, the primer layer has a thickness of 0.01 to 100 µm, more preferably 0.1 to 50 µm, and the hardcoat layer has a thickness of 0.1 to 100 µm, more preferably 1 to 50 µm.

EXAMPLE

Synthesis Examples, Examples and Comparative Examples are given below for illustrating the present invention although the invention is not limited thereto. All parts are by weight. Among abbreviations used herein, Mw denotes a weight average molecular weight, Me denotes methyl, and Ph denotes phenyl.

[Synthesis of Component (A) Containing Component (B)]

Synthesis Example 1

A 5-liter three-necked flask equipped with a thermometer, agitator and condenser was charged with 1,360 parts of methyltrimethoxysilane and 381 parts of isobutanol. Under ice cooling, 1,350 parts of a water-dispersed silica sol (silica solids 20 wt %) was admitted for hydrolysis. The amount of water in the water-dispersed silica sol was 1,080 parts, corresponding to twice the molar amount (30 moles) of hydrolyzable methoxy groups. No particular catalyst was used since the water-dispersed silica sol was acidic. At the end of exothermic reaction, the solution was ripened for 2 hours at 50° C. Then 669 parts of propylene glycol monomethyl ether as a diluent solvent was added to form a coating solution A (solid concentration 25 wt %).

Synthesis Example 2

A 5-liter three-necked flask equipped with a thermometer, agitator and condenser was charged with 1,360 parts of methyltrimethoxysilane, 472 parts of γ-glycidoxypropyltrimethoxysilane and 513 parts of isobutanol. Under ice cooling, 1,215 parts of an acidic water-dispersed silica sol (silica solids 20 wt %) was admitted for hydrolysis. The amount of water in the water-dispersed silica sol was 972 parts, corresponding to 1.5 times the molar amount (36 moles) of hydrolyzable methoxy groups. At the end of exothermic reaction, the solution was ripened for 2 hours at 50° C. Then 450 parts of isopropanol, 670 parts of propylene glycol monomethyl ether and 308 parts of diacetone alcohol as diluent solvents were added to form a coating solution B (solid concentration 25 wt %).

Synthesis Example 3

A 5-liter three-necked flask equipped with a thermometer, agitator and condenser was charged with 1,780 parts of methyltriethoxysilane and 498 parts of isobutanol. Under ice cooling, 1,498 parts of a water-dispersed silica sol (silica solids 20 wt %) was admitted for hydrolysis. The amount of water in the water-dispersed silica sol was 1,198 parts, corresponding to 2.21 times the molar amount of hydrolyzable ethoxy groups. At the end of exothermic reaction, the solution was ripened for 16 hours at 25° C. Then 104 parts of propylene glycol monomethyl ether as a diluent solvent was added to form a coating solution C (solid concentration 25 wt %).

Synthesis Example 4

A 5-liter three-necked flask equipped with a thermometer, agitator and condenser was charged with 1,780 parts of methyltriethoxysilane, 249 parts of isobutanol and 1 part of acetic acid. Under ice cooling, 540 parts of water was added dropwise over 20 minutes for hydrolysis. The amount of water added corresponded to a 1.0 fold of the molar amount of hydrolyzable ethoxy groups. At the end of exothermic reaction, the solution was agitated for 1 hour at room temperature. Then 333 parts of an isobutanol-dispersed silica sol (silica solids 30 wt %) and 500 parts of a methanol-dispersed titania sol (titania solids 20 wt %, Optolake 1120Z by Catalysts & Chemicals Industry Co., Ltd.) were admitted to the solution which was ripened for 2 hours at 50° C. Then 244 parts of propylene glycol monomethyl ether as a diluent solvent was added to form a coating solution D (solid concentration 25 wt %).

Synthesis Example 5

A 5-liter three-necked flask equipped with a thermometer, agitator and condenser was charged with 1,360 parts of methyltrimethoxysilane and 381 parts of isobutanol. Under ice cooling, 720 parts of an isobutanol-dispersed silica sol (silica solids 25 wt %) and 450 parts of an acidic water-dispersed silica sol (silica solids 20 wt %) were admitted for hydrolysis. The amount of water in the water-dispersed silica sol was 360 parts (20 moles), corresponding to 0.67 times the molar amount (30 moles) of hydrolyzable methoxy groups. At the end of exothermic reaction, the solution was ripened for 2 hours at 50° C. Then 849 parts of propylene glycol monomethyl ether as a diluent solvent was added to form a coating solution E (solid concentration 25 wt %).

Synthesis Example 6

A 3-liter three-necked flask equipped with a thermometer, agitator and condenser was charged with 680 parts of methyltrimethoxysilane. Then 1,000 parts of an isopropanol-dispersed silica sol (silica solids 30 wt %) and 108 parts (6 moles) of water were admitted for hydrolysis. The amount of water added corresponded to 0.4 times the molar amount (15 moles) of hydrolyzable methoxy groups. At the end of exothermic reaction, the solution was ripened for 5 hours at 65° C., yielding a coating solution F (solid concentration 36 wt %).

[Synthesis of Component (C)]

Synthesis Example 7

A 2-liter three-necked flask equipped with a thermometer, agitator and condenser was charged with 408 parts of methyltrimethoxysilane and 400 parts of toluene, to which 11 parts of 98% methanesulfonic acid was added as a catalyst. While the flask was kept at an internal temperature below 30° C., 146 parts of water was added dropwise for hydrolysis of methyltrimethoxysilane. After the completion of dropwise addition, the solution was agitated for 2 hours at room temperature to drive the reaction to completion. The acidic ingredient was then neutralized and the methanol formed was distilled off in vacuum. After the neutralization salt was completely removed by twice washing with water, the system was kept in vacuum again to remove the solvent ingredients including toluene until the weight loss before and after 105° C./3 hour drying became 1.1 wt %. There was obtained 210 parts of a siloxane resin G in colorless clear solid form. The resin had a Mw of 7.5×10³ as measured by GPC. On analysis of the resin by ²⁹Si-NMR and IR spectroscopy, the siloxane resin G was identified to have the average compositional formula (6).

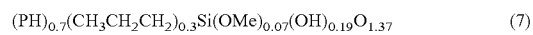
(6)

This clear solid resin had a softening point of 73° C. as measured by an automatic softening point tester of the ring and ball method according to JIS K2207.

The siloxane resin G, 200 parts, was dissolved in 600 parts of isobutanol to form a siloxane resin solution G having a solid concentration of 25 wt %.

Synthesis Example 8

A 2-liter three-necked flask equipped with a thermometer, agitator and condenser was charged with 416 parts (2.1 moles) of phenyltrimethoxysilane, 148 parts (0.9 moles) of propyltrimethoxysilane and 450 parts of toluene, to which 12 parts of 98% methanesulfonic acid was added as a catalyst. While the flask was kept at an internal temperature below 30° C., 162 parts of water was added dropwise for hydrolysis of the alkoxysilanes. After the completion of dropwise addition, the solution was agitated for 2 hours at room temperature to drive the reaction to completion. The acidic ingredient was then neutralized and the methanol formed was distilled off in vacuum. After the neutralization salt was completely removed by twice washing with water, the system was kept in vacuum again to remove the solvent ingredients including toluene until the weight loss before and after 105° C./3 hour drying became 1.6 wt %. There was obtained 371 parts of a siloxane resin H in colorless clear solid form. The resin H had a Mw of 5.8×10³ as measured by GPC. On analysis of the resin by ²⁹Si-NMR and IR spectroscopy, the siloxane resin H was identified to have the average compositional formula (7).

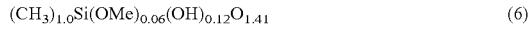
(7)

This clear solid resin had a softening point of 75° C. as measured by an automatic softening point tester of the ring and ball method according to JIS K2207.

The siloxane resin H, 200 parts, was dissolved in 600 parts of isobutanol to form a siloxane resin solution H having a solid concentration of 25 wt %.

[Synthesis of Component (E)]

Synthesis Example 9

A 500-ml three-necked flask equipped with a thermometer, agitator and condenser was charged with 171 parts (0.6 mole) of titanium tetraisopropoxide and 38 parts (0.1 mole) of zirconium tetra-n-butoxide. With stirring at room temperature, 70 parts (0.7 mole) of acetylacetone was added dropwise from a dropping funnel, during which process the internal temperature rose to 63° C. The solution was agitated for one hour at room temperature for ripening, obtaining a hydrolyzable metal compound in yellow clear solution form. The flask was then heated to an internal temperature of 70° C., following which 45 parts (2.5 moles) of a 3% hydrochloric acid aqueous solution was added dropwise over 20 minutes. Reaction was continued at 70-80° C. for 10 hours, obtaining a pale yellowish brown clear solution I at pH 2.79. The solution I had a solid concentration of 29.2 wt %. Absorbance analysis was carried out using a solution obtained by diluting the solution I with ethanol to a solid concentration of 0.05 g/l, finding maximum absorption in the wavelength region of 300 to 350 nm.

Synthesis Example 10

A 500-ml three-necked flask equipped with a thermometer, agitator and condenser was charged with 199 parts (0.7 mole) of titanium tetraisopropoxide. With stirring at room temperature, 140 parts (1.4 moles) of acetylacetone was added dropwise from a dropping funnel while water cooling was effected, during which process the internal temperature rose to 40° C. The solution was agitated for one hour at room temperature for ripening, obtaining a hydrolyzable metal compound in yellow clear solution form. Then 46 parts of a 6.9% aqueous ammonia solution (2.38 moles water) was added dropwise at room temperature over 20 minutes. Reaction was continued at room temperature for 20 hours whereupon a yellowish white precipitate settled out. The precipitate was filtered, washed with acetone and dried in vacuum at 60° C. for 3 hours, obtaining 121 parts of a yellowish white powder. Absorbance analysis was carried out using a solution obtained by diluting the powder with ethanol to a solid concentration of 0.05 g/l, finding absorption in the wavelength region of 300 to 350 nm.

Elemental analysis of the powder showed C: 44.9% and H: 5.3%, confirming the incorporation of acetylacetonato groups.

To 100 parts of the yellowish white powder was added 400 parts of methanol. By agitation, the powder was dissolved in methanol to form a solution J having a solid concentration of 20 wt %.

Examples 1–13 and Comparative Examples 1-4

(1) Preparation of Primer Composition
Primer PC-7A (by Shin-Etsu Chemical Co., Ltd.)

(2) Preparation of Hardcoat Composition
A hardcoat composition was prepared by mixing the ingredients in a proportion as shown in Tables 1 and 2.

(3) Formation of Coated Sample
On a 0.5 mm polycarbonate resin plate whose surface had been cleaned, the primer composition was flow coated and cured at about 120° C. for about 30 minutes to form a cured film of 2 to 5 μm thick. On the primer film, the hardcoat composition of (2) was flow coated and cured at about 130° C. for about 1 hour to form a cured film of 2 to 5 μm thick. The coated sample was evaluated by the tests shown below. The results are shown in Tables 1 and 2.

Examples 14-26

(1) Preparation of Polycarbonate Resin Plate
A polycarbonate resin and an acrylic resin containing 2.0 wt % of a triazine UV absorber and 0.1 wt % of di-t-butylhydroxytoluene (BTH) as an antioxidant were melt co-extruded to form a polycarbonate resin plate having an acrylic resin layer on one surface.

| Polycarbonate resin layer | 0.5 mm |
| Acrylic resin layer | 25 μm |

(2) Preparation of Hardcoat Composition
A hardcoat composition was prepared by mixing the ingredients in a proportion as shown in Table 3.

(3) Formation of Coated Sample
On the acrylic resin layer on the polycarbonate resin plate of (1) as a substrate, the hardcoat composition of (2) was flow coated and cured at about 130° C. for about 1 hour to form a cured film of 2 to 5 μm thick. The coated sample was similarly evaluated. The results are shown in Table 3.

Abrasion Test
Using a Taber abrader mounted with a truck wheel CS-10F and a weight of 500 g, the haze after 500 revolutions was measured. Percent Taber abrasion is expressed by the difference of [haze after test]–[haze before test]. A sample with a haze difference of 8.0 or less is rated as having satisfactory abrasion resistance (symbol ○).

Adhesion Test
According to the crosshatch test of JIS K5400, the coated sample was scribed with a razor along eleven 1-mm spaced apart lines in lateral and transverse directions to define 100 square sections. A commercially available adhesive tape was closely applied and then quickly peeled back in a 90° direction. The number (X) of film sections left intact (not separated) was counted and expressed in term of X/100.

Boiling Water Adhesion Test
The coated sample was immersed in boiling water for 2 hours and air dried for 20 minutes before it was subjected to the same adhesion test as above.

Crack Resistance Test
The coated sample was immersed in boiling water for one hour, heated at 110° C. for one hour, and allowed to stand at room temperature for 20 minutes. The thus cooled sample was visually inspected for outer appearance, especially whether or not cracks formed. A sample without cracks is rated satisfactory (symbol ○).

Accelerated Weathering Test
According to JIS K5400, an accelerated weathering test was carried out using a carbon arc sunshine weatherometer. A sample which after 5,000 hours of weathering exposure, showed no cracks and no separation in the adhesive tape adhesion test is rated satisfactory (symbol ○). Cracks were examined by observing the sample surface with naked eyes and under an optical microscope.

Symbol "X" in conjunction with abrasion resistance, crack resistance and accelerated weathering means that a sample failed the relevant test.

TABLE 1

| Ingredients (pbw) | Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Coating solution A | 1000 | 1000 | | | | | | | | | 1000 | | |
| Coating solution B | | | 1000 | 1000 | | | | | | | | 1000 | |
| Coating solution C | | | | | 1000 | 1000 | 1000 | 1000 | | | | | 1000 |
| Coating solution D | | | | | | | | | 1000 | 1000 | | | |
| Coating solution E | | | | | | | | | | | | | |
| Coating solution F | | | | | | | | | | | | | |
| Siloxane resin solution G | 100 | | 200 | | 30 | 150 | 300 | 450 | 200 | 300 | 600 | | 1000 |
| Siloxane resin solution H | | 300 | | 400 | | | | | | | | 800 | |
| 10% sodium acetate aqueous solution | 1.5 | | | 3 | 4 | | 4 | | | | | 10 | |
| 10% sodium formate aqueous solution | | 1.5 | | | | 1.5 | | 4 | | 6 | | | 8 |
| 10% DBU ethanol solution | | | 1.5 | | | | | | 3 | | 12 | | |
| Solution I | | 55 | | | | | | | | | | 67 | 167 |
| Solution J | | | | 80 | 40 | | 80 | 40 | | 75 | 188 | | |
| Abrasion resistance | ○ | ○ | ○ | ○ | ○ | ○ | ○ | ○ | ○ | ○ | ○ | ○ | ○ |
| % abrasion | 3.2 | 6.2 | 4.7 | 7.4 | 2.1 | 4.0 | 5.9 | 7.9 | 4.9 | 6.6 | 7.2 | 7.8 | 8.0 |

TABLE 1-continued

| Ingredients (pbw) | Example 1 | 2 | 3 | 4 | 5 | 6 | 7 | 8 | 9 | 10 | 11 | 12 | 13 |
|---|---|---|---|---|---|---|---|---|---|---|---|---|---|
| Adhesion | 100/100 | 100/100 | 100/100 | 100/100 | 100/100 | 100/100 | 100/100 | 100/100 | 100/100 | 100/100 | 100/100 | 100/100 | 100/100 |
| Boiling water adhesion | 100/100 | 100/100 | 100/100 | 100/100 | 100/100 | 100/100 | 100/100 | 100/100 | 100/100 | 100/100 | 100/100 | 100/100 | 100/100 |
| Crack resistance | ○ | ○ | ○ | ○ | ○ | ○ | ○ | ○ | ○ | ○ | ○ | ○ | ○ |
| Accelerated weathering | ○ | ○ | ○ | ○ | ○ | ○ | ○ | ○ | ○ | ○ | ○ | ○ | ○ |

TABLE 2

| Ingredients (pbw) | Comparative Example 1 | 2 | 3 | 4 |
|---|---|---|---|---|
| Coating solution A | | | | |
| Coating solution B | | | | |
| Coating solution C | 1000 | 1000 | | |
| Coating solution D | | | | |
| Coating solution E | | | 1000 | |
| Coating solution F | | | | 1000 |
| Siloxane resin solution G | | 300 | | 600 |
| Siloxane resin solution H | | | | |
| 10% sodium acetate aqueous solution | 4 | | 4 | |
| 10% sodium formate aqueous solution | | | | |
| 10% DBU ethanol solution | | | | 10 |
| Solution I | | | | |
| Solution J | | 40 | 80 | 80 |
| Abrasion resistance | ○ | X | X | X |
| % abrasion | 2.5 | 17.5 | 14.3 | 35.5 |
| Adhesion | 100/100 | 20/100 | 0/100 | 0/100 |
| Boiling water adhesion | 100/100 | 0/100 | 0/100 | 0/100 |
| Crack resistance | X | X | X | X |
| Accelerated weathering | X | X | X | X |

TABLE 3

| Ingredients (pbw) | Example 14 | 15 | 16 | 17 | 18 | 19 | 20 | 21 | 22 | 23 | 24 | 25 | 26 |
|---|---|---|---|---|---|---|---|---|---|---|---|---|---|
| Coating solution A | 1000 | 1000 | | | | | | | | | 1000 | | |
| Coating solution B | | | 1000 | 1000 | | | | | | | | 1000 | |
| Coating solution C | | | | | 1000 | 1000 | 1000 | 1000 | | | | | |
| Coating solution D | | | | | | | | | 1000 | 1000 | | | 1000 |
| Coating solution E | | | | | | | | | | | | | |
| Coating solution F | | | | | | | | | | | | | |
| Siloxane resin solution G | 100 | | 200 | | 30 | 150 | 300 | 450 | 200 | 300 | 600 | | 1000 |
| Siloxane resin solution H | | 300 | | 400 | | | | | | | | 800 | |
| 10% sodium acetate aqueous solution | 1.5 | | | 3 | 4 | | 4 | | | | | 10 | |
| 10% sodium formate aqueous solution | | 1.5 | | | | 1.5 | | 4 | | 6 | | | 8 |
| 10% DBU ethanol solution | | | 1.5 | | | | | | 3 | | 12 | | |
| Solution I | | 55 | | | | | | | | | | 67 | 167 |
| Solution J | | | | 80 | 40 | | 80 | 40 | | 75 | 188 | | |
| Abrasion resistance | ○ | ○ | ○ | ○ | ○ | ○ | ○ | ○ | ○ | ○ | ○ | ○ | ○ |
| % abrasion | 3.0 | 7.1 | 4.2 | 5.5 | 3.3 | 3.8 | 5.1 | 6.8 | 4.7 | 6.0 | 6.6 | 7.7 | 7.9 |
| Adhesion | 100/100 | 100/100 | 100/100 | 100/100 | 100/100 | 100/100 | 100/100 | 100/100 | 100/100 | 100/100 | 100/100 | 100/100 | 100/100 |
| Boiling water adhesion | 100/100 | 100/100 | 100/100 | 100/100 | 100/100 | 100/100 | 100/100 | 100/100 | 100/100 | 100/100 | 100/100 | 100/100 | 100/100 |
| Crack resistance | ○ | ○ | ○ | ○ | ○ | ○ | ○ | ○ | ○ | ○ | ○ | ○ | ○ |
| Accelerated weathering | ○ | ○ | ○ | ○ | ○ | ○ | ○ | ○ | ○ | ○ | ○ | ○ | ○ |

The hardcoat composition of the invention forms a hardcoat film which is satisfactory in hardness, transparency and adhesion, has improved weather resistance in that it is unsusceptible to micro-cracking and separation even after long-term outdoor exposure, and presents a surface that is repellent to marker ink and thus inhibitory to staining and graffiti. An article having a hardcoat film thereon has all these advantages.

The invention claimed is:

1. A hardcoat composition comprising
   (A) a hydrolytic condensate having a weight average molecular weight of less than 2,000 obtained by hydrolytic condensation of at least one hydrolyzable silicon compound of the general formula (1):

$$R^1_a SiX_{(4-a)} \tag{1}$$

wherein $R^1$ is an organic group having 1 to 18 carbon atoms, X is a hydrolyzable group, and "a" is an integer of 0 to 2, with the proviso that a compound of only a=0 and a compound of only a=2 are excluded, with at least 1 mole of water per mole of the hydrolyzable group X,
   (B) a metal oxide,
   (C) a siloxane resin represented by the average compositional formula (2):

$$R^2_b Si(OR^3)_c(OH)_d O_{(4-b-c-d)/2} \tag{2}$$

wherein $R^2$ is independently an organic group having 1 to 18 carbon atoms, $R^3$ is independently an organic group having 1 to 4 carbon atoms, b, c and d are numbers satisfying $0.8 \leq b \leq 1.5$, $0 \leq c \leq 0.3$, $0.01 \leq d \leq 0.5$, and $0.801 \leq b+c+d<2$, and having a weight average molecular weight of at least 2,000, which is solid at a temperature of not higher than 40° C., and
   (D) a curing catalyst.

2. The hardcoat composition of claim 1 wherein 3 to 100 parts by weight of component (C) is present per 100 parts by weight of components (A) and (B) combined.

3. The hardcoat composition of claim 1 wherein component (A) is obtained by subjecting the hydrolyzable silicon compound of formula (1) to hydrolytic condensation in a metal oxide sol having the metal oxide (B) dispersed in water.

4. The hardcoat composition of claim 1 wherein the metal oxide (B) is an oxide or compound oxide of at least one metal selected from the group consisting of silicon, titanium, zirconium, hafnium, zinc, iron, antimony, tin, cerium, and aluminum.

5. The hardcoat composition of claim 1 wherein the siloxane resin (C) has a softening point of 60 to 90° C.

6. The hardcoat composition of claim 1 wherein at least 70 mol % of siloxane units of which the siloxane resin (C) is constructed are siloxane units of the general formula (3):

$$R^4 SiO_{3/2} \tag{3}$$

wherein $R^4$ is independently an organic group having 1 to 18 carbon atoms, at least 80 mol % of $R^4$ being an organic group having 1 to 6 carbon atoms.

7. A hardcoat composition comprising,
   (A) a hydrolytic condensate having a weight average molecular weight of less than 2,000 obtained by hydrolytic condensation of at least one hydrolyzable silicon compound of the general formula (1):

$$R^1_a SiX_{(4-a)} \tag{1}$$

wherein $R^1$ is an organic group having 1 to 18 carbon atoms, X is a hydrolyzable group, and "a" is an integer of 0 to 2, with the proviso that a compound of only a=0 and a compound of only a=2 are excluded, with at least 1 mole of water per mole of the hydrolyzable group X,
   (B) a metal oxide,
   (C) a siloxane resin represented by the average compositional formula (2):

$$R^2_b Si(OR^3)_c(OH)_d O_{(4-b-c-d)/2} \tag{2}$$

wherein $R^2$ is independently an organic group having 1 to 18 carbon atoms, $R^3$ is independently an organic group having 1 to 4 carbon atoms, b, c and d are numbers satisfying $0.8 \leq b \leq 1.5$, $0 \leq c \leq 0.3$, $0.01 \leq d \leq 0.5$, and $0.801 \leq b+c+d<2$, and having a weight average molecular weight of at least 2,000, which is solid at a temperature of not higher than 40° C., and
   (D) a curing catalyst, and
   (E) a hydrolyzate or hydrolytic condensate of a reaction product or mixture of a metal alkoxide having the general formula (4):

$$M(OR^5)_n \tag{4}$$

wherein M is at least one metal selected from the group consisting of Ti, Zr, Hf, Al, Fe, Zn, In, Cu, Sn, W and Ce, n is the valence of the metal, and $R^5$ is an organic group having 1 to 6 carbon atoms, with a β-diketone and/or β-ketoester, in an amount of 1 to 30 parts by weight per 100 parts by weight of components (A) and (B) combined.

8. The hardcoat composition of claim 7 wherein component (E) is a hydrolyzate or hydrolytic condensate obtained by subjecting a reaction product or mixture of 1 mole of the metal alkoxide with 0.5 to (n−0.5) moles of the β-diketone and/or β-ketoester having the general formula (5):

$$R^6 COCH_2 COR^7 \tag{5}$$

wherein $R^6$ is a $C_{1-8}$ alkyl group or aryl group, $R^7$ is a $C_{1-8}$ alkyl group, aryl group or $C_{1-4}$ alkoxy group, and n is as defined above, to hydrolysis or hydrolytic condensation in 0.5 to 30 moles of water.

9. An article comprising a substrate and a hardcoat film which is formed on the substrate by applying and curing the hardcoat composition of claim 1 thereto.

10. An article comprising a plastic substrate having a primer layer on a surface and a hardcoat film which is formed on the substrate by applying and curing the hardcoat composition of claim 1 to the primer layer on the substrate.

11. The hardcoat composition of claim 1, wherein component (C) is obtained by hydrolytic reaction of an alkoxysilane as the hydrolyzable silane compound, with water, in the presence of a non-polar solvent, followed by polycondensation, and wherein the amount of water used in the hydrolysis is 0.6 to 1.0 mole, per mole of hydrolyzable groups, and wherein the hydrolytic reaction is carried out under strongly acidic conditions at a pH of below 2.

12. The hardcoat composition of claim 1, wherein component (A) is obtained by hydrolytic condensation of an alkoxysilane of general formula (1) as a hydrolyzable silicon compound:

$$R^1_a SiX_{(4-a)} \tag{1}$$

wherein $R^1$ is an organic group having 1 to 18 carbon atoms, X is an alkoxy group, and "a" is an integer of from 0 to 2, with the proviso that a compound of only a=0 and a compound of only a=2 are excluded, and with at least 1.2 moles of water per mole of the alkoxy group X, in the presence of a polar organic solvent, under weakly acidic conditions at a pH of 2-7.

13. The hardcoat composition of claim 1, wherein component (A) is obtained by hydrolytic condensation of an alkoxysilane of general formula (1) as a hydrolyzable silicon compound:

  (1)

wherein $R^1$ is an organic group having 1 to 18 carbon atoms, X is an alkoxy group, and "a" is an integer of from 0 to 2, with the proviso that a compound of only a=0 and a compound of only a=2 are excluded, and with at least 1.2 moles of water per approximately one mole of the alkoxy group X, in the presence of a polar organic solvent, under weakly acidic conditions at a pH of 2-7, and wherein component (C) is obtained by hydrolytic reaction of an alkoxysilane as the hydrolyzable silane compound, with water, in the presence of a non-polar solvent, followed by polycondensation, and wherein the amount of water used in the hydrolysis is 0.6 to 1.0 mole per mole of hydrolyzable groups, and wherein the hydrolytic reaction is carried out under strongly acidic conditions at a pH of below 2.

* * * * *